United States Patent [19]

Walker et al.

[11] Patent Number: 4,486,343
[45] Date of Patent: Dec. 4, 1984

[54] PROTEIN ISOLATES AND METHOD OF PRODUCING THEM

[75] Inventors: Neil J. Walker, Sebastopol, Calif.; Philip B. Connolly, North Nowra, Australia

[73] Assignee: New Zealand Milk Products, Inc., Petaluma, Calif.

[21] Appl. No.: 477,509

[22] Filed: Mar. 21, 1983

Related U.S. Application Data

[63] Continuation-in-part of Ser. No. 410,057, Aug. 20, 1982, abandoned which is a continuation of Ser. No. 259,440, May 1, 1981, abandoned.

[51] Int. Cl.$^3$ ............................................. A23J 3/00
[52] U.S. Cl. .................................. 260/112 G; 426/656; 260/120
[58] Field of Search .................. 426/656, 657, 436; 260/112 G, 120

[56] References Cited

U.S. PATENT DOCUMENTS

| | | | |
|---|---|---|---|
| 2,952,542 | 9/1960 | Giddey | 426/656 X |
| 3,030,211 | 4/1962 | McDonald | 426/656 X |
| 3,397,991 | 8/1968 | Johnson et al. | 426/656 |
| 3,440,054 | 4/1969 | Sair | 426/656 X |
| 3,770,452 | 11/1973 | Finley | 426/656 X |

FOREIGN PATENT DOCUMENTS

| | | | |
|---|---|---|---|
| 532741 | 11/1956 | Canada | 260/112 G |
| 55-18510 | 10/1978 | Japan | |
| 55-49818 | 5/1980 | Japan | |

OTHER PUBLICATIONS

Wu, C. H. et al., "Preparation and Properties of Acid-Solubilized Gluten, J. Agric. Food Chem., vol. 24, #3, 1976, pp. 504–510.
Hodgman, C. D. et al., "Handbook of Chemistry and Physics", Forty First Ed., Chem. Rubber Publ. Co., Cleveland, Ohio, 1960, p. 1721.

*Primary Examiner*—Robert Yoncoskie
*Attorney, Agent, or Firm*—Frank A. Neal

[57] ABSTRACT

Wheat protein is conditioned for solubilization by first dispersing it in water at a temperature of about 5°–35° C. and a concentration of about 2–20% and then by acidifying the dispersion to a pH of 0.5–3.0. The acidified dispersion is then solubilized by effectively heating it to from about 70° C. for from about 65 minutes to about 4 hours to about 120° C. for from about 30 seconds to about 5 minutes.

Acid-solubilized wheat proteinate in solution is precipitated by adjustment of the pH of the solution to its isoelectric point. The acid condition of the wheat proteinate solution is employed to acidulate fluid skim milk and form a caseinate-wheat proteinate co-precipitate.

10 Claims, No Drawings

PROTEIN ISOLATES AND METHOD OF PRODUCING THEM

RELATED APPLICATION

This application is a continuation-in-part of application Ser. No. 410,057, filed Aug. 20, 1982, now abandoned, which is a continuation of Ser. No. 259,440 filed May 1, 1981, now abandoned.

BACKGROUND OF THE INVENTION

The predominant protein of milk is casein, a phosphoprotein of high nutritional value, which is present in its native state in milk as a colloidal suspension of micellar agglomerates comprising $\alpha$-, $\beta$- and $\kappa$-casein, plus phosphate and calcium. The casein protein(s), which comprise approximately 3% by weight of fluid cows' milk, may be distinguished from the so-called whey proteins by their insolubility at isoelectric pH 4.6, and casein is most commonly isolated by processes which involve acidification of skim milk to the isoelectric pH level. In commercial practice, pH reduction is achieved either by direct addition of an appropriate food-grade acid to skim milk or by formation of lactic acid in situ by bacterial fermentation of the lactose in the skim milk.

The casein coagulum (curd) produced by acidification of skim milk contains some non-protein milk solids such as mineral salts and lactose which are removed by washing the curd several times in water. The washed curd can then be dried directly to yield a product known as acid casein, or rendered soluble prior to drying by reaction with an alkali or alkaline salts. The soluble derivatives are known as caseinates and these products have physico-chemical, functional, and nutritional properties which make them useful ingredients in a wide variety of food preparations. Caseinates for example will act as emulsifying, thickening, water binding and foam stabilizing agents in foods. In some applications, such as cheese analogs, the caseinates not only function as emulsifiers of oil in water, but also exhibit thermoplasticity which promotes authentic cheese melt characteristics in the cheese-like substance. In this latter property casein and caseinates are somewhat unique among those commercially-available protein isolates and concentrates which are suitable for use in formulated food products.

There are potentially available abundant quantities of vegetable protein, to be derived from legumes, cereal grains, and nuts. A number of soy protein isolates and concentrates are already available commercially and these proteins exhibit some of the functional properties of casein and caseinates. However, classic isolated soy proteins are not thermoplastic, which limits the use of these products in certain food applications as described above. Wheat gluten, on the other hand, is a protein concentrate which does exhibit thermoelastic properties and it could possibly be used together with, or in place of, casein in formulated food systems, were it not for the extreme insolubility of the gluten proteins.

It is generally known that wheat gluten proteins can be rendered soluble by acid hydrolysis as described by Holme and Briggs in Cereal Chemistry, Volume 36, Page 321 (1959). However, published procedures for the preparation of acid-solubilized wheat gluten, as described by Wu, Nakai and Powrie in the Journal of Agriculture and Food Chemistry, Volume 24, Page 504 (1976), suggest the need for high heat treatment of an aqueous gluten slurry in an autoclave at a low pH. Such a solubilization process is considered to be impractical for implementation on a large production plant scale, firstly because of equipment requirements and secondly because excessive quantities of acid are needed. However, if the acidified wheat gluten solution were to be used as the precipitant in the manufacture of acid casein from skim milk, the practical disadvantage of excessive acid usage would be greatly diminished, since an approximately equivalent amount of acid would be required, in any event, to acidify the skim milk to the isoelectric pH of casein. It was believed that if high temperature high pressure treatment of wheat gluten could be avoided by control of reaction time, it would be possible to produce, in an acid solution, non-devitalized soluble wheat proteins which will precipitate at the same pH as casein in combination with skim milk.

SUMMARY OF THE INVENTION

It is the general object of the invention to provide a practical and economic process for the isolation of soluble wheat protein, either alone, or in combination with casein from skim milk. It is a further object of the invention to provide a process for the co-precipitation of casein and wheat protein, the latter being in a form which will enhance, or at least not decrease, the functional properties of casein, particularly the property of thermoplasticity.

The protein isolate prepared according to the present invention contains casein and soluble wheat protein in a ratio from about 99 parts casein to 1 part wheat protein through a ratio of about 0 parts casein to about 100 parts wheat protein. The mixture of proteins is isolated in a curd form which is easy to process by mechanical means to remove residual carbohydrate and mineral salts. The curd becomes finer as the ratio of wheat protein to casein is increased, but even at the extreme of 100 parts wheat protein and 0 parts casein, the curd can be washed and dewatered by commercially available means, such as centrifugation or super decantation.

According to the present invention, either vital wheat gluten, a commercially available wheat protein concentrate containing 65–75% protein, or wheat flour, containing approximately 10–15% protein, is dispersed in water at a temperature of from about 5° C. to about 35° C. and at a concentration of from about 2% protein to about 20% protein, the preferred protein concentration range being 5–10%. Sufficient food-grade acid is added to the dispersion to reduce the pH to within the range of 0.5–3.0, a pH of 1.5 being preferred, and the acidified dispersion is heated with gentle agitation to 70° C.–120° C. for from about 4 hours to about 30 seconds to solubilize the proteins.

The heating times at selected temperatures along the 70° C.–120° C. range are as follows: about 65 mins.–4 hrs. at 70° C.; about 9 mins.–1.5 hrs. at 85° C.; about 2 mins.–28 mins. at 100° C.; and about 30 secs.–5 mins. at 120° C. Samples treated at 70° C., 85° C. and 100° C. were heated in a batch process, while samples treated at 120° C. were subjected to a high temperature-short time (HTST) process using a heat exchanger and direct steam injection to obtain the required temperature. At these temperatures for these times, higher yields of protein are obtained and the protein is non-devitalized.

The above acidified wheat protein solution is then added to fluid skim milk, or a caseinate solution, the volume ratio being calculated to give the desired ratio of casein to wheat protein. If necessary, the pH of the mixture is then adjusted to within the range 3.5–6.0, preferably 4.6, using either alkali or acid. If a ratio of 100 parts wheat protein to zero parts casein is desired, no skim milk or caseinate is added to the solubilized wheat protein, which needs to be precipitated at pH 4.6 by addition of a food-grade alkali to the acid slurry.

The curd which results from this process can be separated from the liquid serum in a number of ways, either by passing the suspension through a fine-mesh screen filter or by use of a centrifuge, clarifier or super decanter and/or by use of the conventional separation equipment used in the production of casein, lactalbumin or vegetable proteins. The separated curd is thoroughly washed with clean water to remove any non-protein milk or gluten solids and is separated from the wash water in the same manner as described above for separation of precipitated curd from the liquid serum. The washed curd can then be preserved by drying or can be resuspended and solubilized by reaction with an alkaline agent.

The washed casein-wheat protein curd resulting from the process of the present invention contains at least 90% protein on a moisture free basis. Usually the resulting curd contains 95% protein, with the remainder consisting mainly of ash and trace amounts of fat and carbohydrate. The yield of protein from the co-precipitation process is in excess of 90% of the casein and precipitable wheat protein present in the individual components of the admixture and more usually the yield is approximately 95%.

The liquid serum which results from co-precipitation of casein and wheat protein by the above-described process contains the milk-derived soluble whey proteins as would normally be present in the whey as a by-product of conventional acid casein manufacture. The liquid serum does not contain any significant quantity of wheat protein which essentially all precipitates with the casein. The serum contains lactose, mineral salts, whey protein, carbohydrate material from wheat gluten, pigments and small quantities of non-protein nitrogen material from both milk and wheat gluten.

The casein-wheat protein curd prepared by the process described in this invention is totally soluble in alkali agents at near to neutral pH. Resolubilization of the curd is achieved by resuspending the curd in sufficient water and adding alkaline agents to the protein suspension. The quantity of alkaline agent necessary to solubilize the co-precipitated casein-wheat protein curd is slightly less than the amount of alkaline agent used when solubilizing an equivalent amount of casein at equivalent pH.

The casein-wheat protein curds prepared according to the present invention are quite different from any curd-like material which can be prepared by simply mixing casein curd and vital wheat gluten. For example, a cheese substitite prepared from a simple mixture of casein or caseinate and vital wheat gluten has a mealy texture and exhibits poor melt and stretch, mainly because of the extreme insolubility of the protein in vital wheat gluten. By comparison, the casein-wheat protein co-precipitate curd or its soluble derivatives, can be utilized in the preparation of a cheese-like substance, which has similar texture, body and melt properties to a natural cheese or to a cheese subtitute prepared from casein or caseinate as the sole protein ingredient.

DETAILED DESCRIPTION

EXAMPLE 1

As an example of the process of the present invention 20 grams of vital wheat gluten containing approximately 70% protein was dispersed in 180 grams of water at 25° C. Sufficient 5N hydrochloric acid was added to reduce the pH of the slurry to 1.5. The acidified slurry was then heated to 72° C. and held at that temperature for 60 minutes with gentle agitation. The acid-treated wheat gluten solution, which was light tan in color and possessed a mild cereal odor, was cooled and combined with 500 grams pasteurized fluid skim milk. The pH of the mixture was measured as 4.6 and a curd formed at that pH. The mixture was heated to 50° C. to temper the curd and separate it from the liquid serum by filtration. The curd was washed three times in de-ionized water and separated from the wash water each time by filtration. The resulting curd and liquid serum were analyzed for nitrogen content using the Kjeldahl method and the yield of protein was then calculated as follows:

$$\text{Yield (\%)} = \frac{\text{nitrogen content of curd} \times 100}{\text{precipitable nitrogen in admixture}}$$

The precipitable nitrogen in the admixture is the sum of precipitable nitrogen in the wheat gluten and casein nitrogen in skim milk.

The casein-wheat protein curd particles were relatively large and granular and they were easily separated from the serum by filtration. The washed curd was relatively free of non-protein milk or wheat contaminants, being 96.2% protein ($N \times 6.25$) on a moisture-free basis. The serum contained approximately the same amount of nitrogen (0.12%) as is normally found in acid casein whey and the yield was calculated to be 95.8%.

As a control, a second sample of skim milk was adjusted directly to pH 4.6 using hydrochloric acid and the resulting curd was tempered, separated and washed three times as above. The resulting washed curd particles were large and granular and they were easily separated from the whey by filtration. The curd contained 96.8% protein on a moisture free basis and the whey contained 0.11% nitrogen, which is typical of acid casein whey. The yield of precipitable protein calculated from the above formula was 99.2%.

EXAMPLE 2

As a further example of the process of the present invention 20 grams of vital wheat gluten was dispersed in 180 grams of water at 25° C. and sufficient 5N hydrochloric acid was added to reduce the pH of the slurry to 1.5. The dispersion was heated to 70° C. and held at that temperature with gentle agitation for 60 minutes to solubilize the wheat proteins. The pH of the slurry was then adjusted to pH 4.7 using 2N sodium hydroxide, resulting in the formation of a curd and liquid serum. The curd was separated from the serum by suction filtration, washed three times with de-ionized water and separated each time using suction filtration. The curd and serum were analyzed for nitrogen using the Kjeldahl method and the yield of protein was then calculated.

The wheat protein curd particles were light tan in color and considerably smaller than those obtained by the co-precipitation process outlined in Example 1.

Therefore, separation of the curd from the liquid serum is more difficult in this instance and is more easily achieved by centrifugation than by suction filtration. The washed wheat protein curd contained 95% protein on a moisture free basis. The liquid serum contained approximately 0.1% nitrogen and the yield of protein obtained from the wheat gluten was 94.5%. The washed wheat protein curd was readily solubilized using an alkaline agent such as sodium hydroxide to a pH of about 7.0.

EXAMPLE 3

In order to evaluate the properties of a casein-wheat protein co-precipitate, curds were prepared from a mixture of acid-treated wheat gluten and skim milk, from skim milk above, and from wheat gluten alone, as described in Examples 1 and 2 above. The washed curds were re-suspended in water and solubilized by adjusting the pH of the curd slurries to 6.8 with 2N sodium hydroxide. The temperature of the slurries was raised to 60° C. during the solubilization process. The sodium proteinate solutions were evaluated for solubility, emulsification capacity, whipping capacity and foam stability in a direct comparison between the sodium wheat/milk proteinate, the sodium wheat proteinate and sodium caseinate. The results are shown in the following table:

|  | Sodium salt derivatives | | |
|---|---|---|---|
|  | Casein-wheat Proteinate | Wheat Proteinate | Sodium Caseinate |
| Solubility (%) | 100 | 100 | 100 |
| Emulsification capacity (ml vegetable oil/1 g protein) | 102.7 | 98.8 | 100 |
| Whipping overrun (%) | 790 | 790.5 | 700 |
| Foam stability (minutes): | | | |
| Initial breakdown | 21.0 | 27.5 | 11.0 |
| 3 ml weeping | 30.0 | 35.5 | 18.0 |
| 5 ml weeping | 34.0 | 38.0 | 24.0 |
| 10 ml weeping | 42.0 | 48.0 | 36.0 |

The results show that by the process of the present invention it is possible to produce a co-precipitated casein-wheat protein, or even a soluble wheat protein isolate, which has physico-chemical and functional properties very similar to those of casein. The wheat protein has been treated in such a manner that it precipitates as a curd in the same pH range as casein and exhibits similar and complementary solubility and functional properties.

EXAMPLE 4

In order to evaluate the thermoplastic properties of the casein-wheat protein co-precipitate, approximately 300 grams of curd was produced by the method described in Example 1 using 80 grams of vital wheat gluten and 2 liters of skim milk. The washed curd contained 95.6% protein on a moisture free basis with an approximately 52% contribution from wheat protein nitrogen and an approximately 48% contribution from casein nitrogen. The yield of precipitable protein was 98.6% and the liquid serum contained 0.107% nitrogen.

The wet casein-wheat protein curd contained approximately 65% water, and 296 grams of this curd was used to prepare, in a steam-jacketed Hobart mixing bowl, a cheese-like substance containing 48.1% moisture, 23.6% protein and 22.4% vegetable oil. In the preparation of the cheese-like substance, calcium hydroxide and tri-sodium phosphate (0.5% and 0.02% by weight to weight of cheese-like substance, respectively) were used to disperse the curd at 65° C. prior to addition of the vegetable oil, di-sodium phosphate (an emulsifying salt), sodium chloride, and an acidulant, with a total mixing time of approximately 5 minutes. The cheese-like substance produced in this manner was removed from the mixer, formed into a mold, and refrigerated overnight before evaluation of appearance, color, flavor, slice and shred characteristics, texture, and melting properties.

The cheese-like substance produced from the casein-wheat protein co-precipitate curd was a very light tan to light grey in color, and it possessed a mild cereal flavor. The material was deliberately not artificially flavored or colored so that the natural properties could be evaluated. The cheese-like substance was homogeneous in texture, producing a smooth and clean slice and shred. It demonstrated homogeneous plastic melting and stretching characteristics similar to those in a natural cheese or in an imitation cheese made in an identical manner from the control casein curd.

What is claimed is:

1. A method of producing wheat protein comprising dispersing wheat protein, selected from the class consisting of vital wheat gluten and wheat flour, in water at a temperature of about 5°–35° C. and a concentration of about 2–20% protein, reducing the pH of the dispersion to about 0.5–3.0, heating the dispersion to a temperature of from about 70° C. for about 65 mins.–4 hours to about 120° C. for about 30 secs.–5 mins. to solubilize the protein, and adjusting the pH to about 3.5–6.0 to precipitate wheat protein, wherein heating above 100° C. is carried out under high temperature short time conditions.

2. The method of claim 1, the protein concentration of the dispersion being about 5–10% and the pH of the dispersion being reduced to about 1.5, further including separating and recovering the wheat protein.

3. Wheat protein produced according to the method of claim 2.

4. A method of producing wheat proteinate comprising dispersing wheat protein, selected from the class consisting of vital wheat gluten and wheat flour, in water at a temperature of about 5°–35° C. and a concentration of about 2–20% protein, reducing the pH of the dispersion to about 0.5–3.0, heating the dispersion to a temperature of from about 70° C. for about 65 mins.–4 hrs. to about 120° C. for about 30 secs.–5 mins. to solubilize the protein, adjusting the pH to about 3.5–6.0 to precipitate wheat protein, washing said protein, re-suspending said protein in water and solubilizing the same with an alkaline agent, and drying the resulting solution to obtain the wheat proteinate solute thereof, wherein heating above 100° C. is carried out under high temperature short time conditions.

5. Wheat proteinate produced according to the method of claim 4.

6. A method of producing casein-wheat protein comprising dispersing wheat protein, selected from the class consisting of vital wheat gluten and wheat flour, in water at a temperature of about 5°–35° C. and a concentration of about 2–20% protein, reducing the pH of the dispersion to about 0.5–3.0, heating the dispersion to a temperature of from about 70° C. for about 65 mins.–4 hrs. to about 120° C. for about 30 secs.–5 mins. to solubilize the protein, and mixing the resultant solution with a material selected from the class consisting of fluid skim milk and sodium caseinate solution to provide a pH for the mixture of about 3.5–6.0 and thereby precipitate casein-wheat protein.

7. The method of claim 6, the protein concentration of the dispersion being about 5–10%, the pH of the dispersion being reduced to about 1.5, further including separating and recovering the casein-wheat protein.

8. Casein-wheat protein produced according to the method of claim 7.

9. A method of producing casein-wheat proteinate comprising dispersing wheat protein, selected from the class consisting of vital wheat gluten and wheat flour, in water at a temperature of about 5°–35° C. and a concentration of about 2–20% protein, reducing the pH of the dispersion to about 0.5–3.0, heating the dispersion to a temperature of from about 70° C. for about 65 mins.–4 hrs. to about 120° C. for about 30 secs.–5 mins. to solubilize the protein, mixing the resultant solution with a material selected from the class consisting of fluid skim milk and sodium caseinate solution to provide a pH for the mixture of about 3.5–6.0 and thereby precipitate casein-wheat protein, washing said protein, re-suspending said protein in water and solubilizing the same with an alkaline agent, and drying the resulting solution to obtain the casein-wheat proteinate solute thereof.

10. Casein-wheat proteinate produced according to the method of claim 9.

* * * * *